Aug. 6, 1946.  J. H. BEACH  2,405,127
VALVE
Filed June 9, 1943
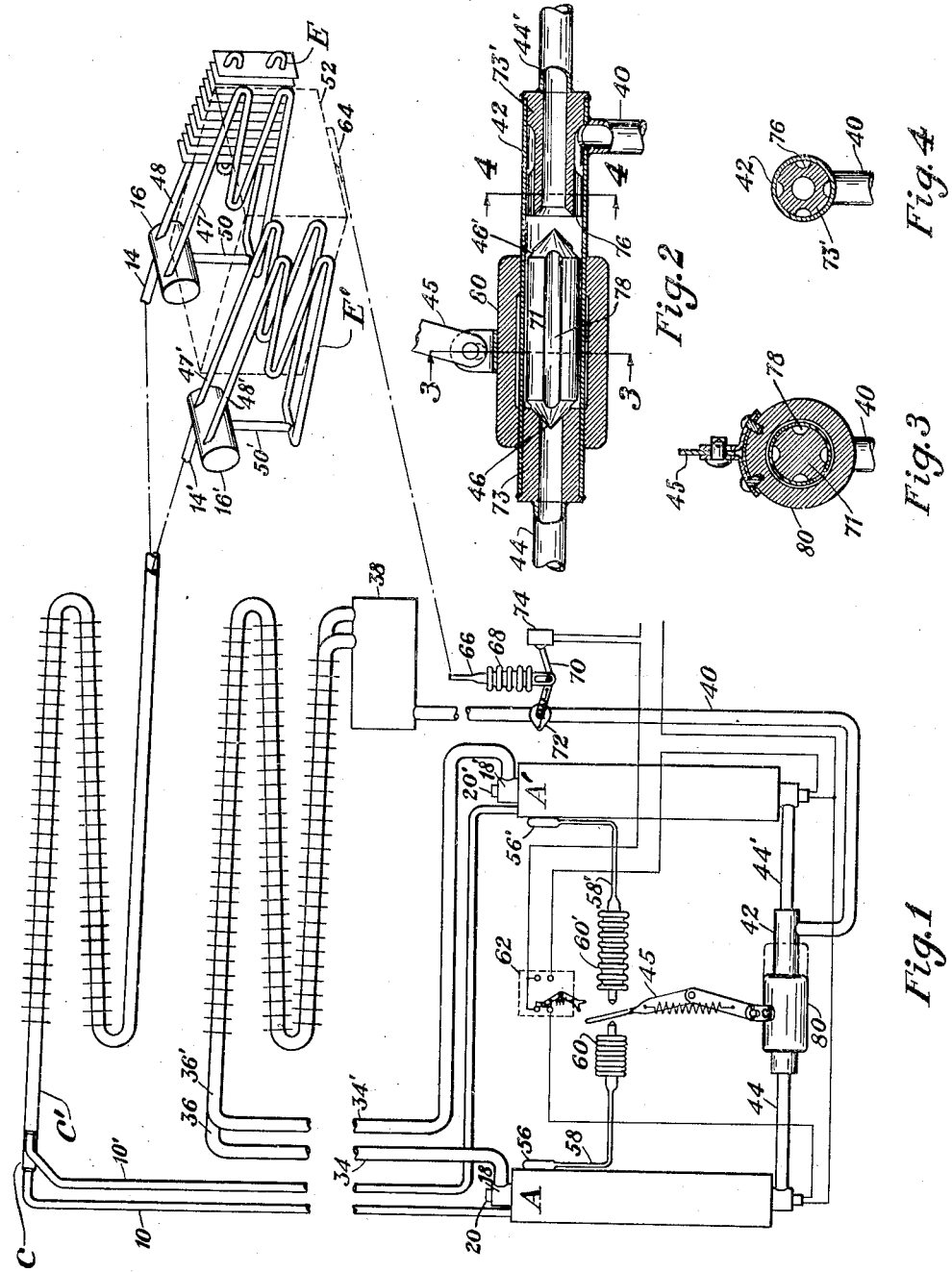
INVENTOR.
Justice H. Beach
BY
Harry S. Dumass Patented Aug. 6, 1946

2,405,127

UNITED STATES PATENT OFFICE 2,405,127

VALVE

Justice H. Beach, Canton, Ohio, assignor to The Hoover Company, North Canton, Ohio, a corporation of Ohio Application June 9, 1943, Serial No. 490,139

10 Claims. (Cl. 137—139)

1

This invention relates to refrigeration and more particularly to a valve for controlling the flow of fluids through a hermetically sealed system such as an indirect cooling circuit of a refrigerating machine, or the flow of fluid such as the refrigerant, the absorbent or the solution of an absorption refrigerating apparatus of the three-fluid type or the flow of fluids in any other hermetically closed fluid circulating system.

In such machines it is sometimes necessary to divert fluid from one place to another. That is not a simple matter because the valve must be positive in action and the actuating force must be transmitted through the system walls in order to move the valve positioned on the interior of the system walls.

According to the present invention a slidable valve is provided on the interior of the apparatus to cooperate with valve seats so that when the valve is shifted, the fluid flow to one circuit is stopped and diverted to another circuit. A permanent magnet is slidably mounted on the exterior of the system walls so that when the magnet is moved, the valve moves with it and therefore it is not necessary to establish a mechanical connection from the exterior to the valve on the interior.

The system wall immediately beneath the permanent magnet is made of non-magnetic material so that the magnetic lines of force are not diverted to other parts of the system, the slidable valve is made of magnetic material as are the valve seats so that when the valve is closed upon its seat a closed magnetic circuit is formed from the magnet through the non-magnetic walls, through the valve seat and the slidable valve, and back through the non-magnetic wall to the other pole of the permanent magnet.

By way of exemplification the valve according to this invention has been disclosed as controlling the flow of an auxiliary cooling medium in an indirect cooling circuit for two intermittent absorption refrigerating machines operating alternately on the absorption-evaporation and generation-condensation phases so that when one generator-absorber is changed from the generation phase to the absorption phase, cooling fluids can be diverted from the generator-absorber which has just finished the absorption phase to that which has just started the absorption phase.

It is to be understood, however, that the invention is not limited to such use but can be used anywhere in industrial and other apparatus where it is desirable to control the flow of fluids in a hermetically sealed system.

2

Other objects and advantages of this invention will become apparent when taken in connection with the accompanying drawing, in which:

Figure 1 shows a diagrammatic representation of two intermittently operating absorption refrigerating units having an indirect cooling circuit with the control valve of this invention applied thereto;

Figure 2 is a detailed cross sectional showing of the valve according to this invention;

Figure 3 is a cross sectional view taken on line 3—3 of Figure 2; and

Figure 4 is a cross sectional view taken on line 4—4 of Figure 2.

Referring to Figure 1 of the drawing, A, A' represents two generator-absorbers, C, C' two primary condensers, and E, E' two evaporators. The absorbent-receiving chambers of the generator-absorbers A, A' are connected to condensers C, C' by conduits 10, 10'. The condensers C, C' have a downwardly inclined slope throughout and are connected by conduits 14, 14' to receiving vessels 16, 16', which form a part of the evaporators E, E'.

Each generator-absorber A, A' has an absorbent-receiving chamber formed by the outer cylindrical walls of the vessels A, A', the outer cylindrical walls of the heat exchange vessels 18, 18' and end closures (not shown) welded to the cylindrical walls. The annular chambers so formed are provided with suitable trays (not shown) having openings in the walls thereof and welded to the inner and outer cylindrical walls of the annular chambers. These trays support any well known solid absorbent such as strontium chloride which will absorb the refrigerant vapor such as ammonia, which solid absorbent may be charged into the absorption chamber in any manner well known to the art.

The heat exchange vessels 18, 18' are formed of inner and outer cylindrical walls having end closures welded thereto and form annular receiving chambers for an indirect cooling fluid of the indirect cooling circuit for the generator-absorbers A, A', the construction and operation of which will be described in more detail hereinafter. In the cylindrical space formed by the inner cylindrical vessels of the heat exchange vessels 18, 18' are electric heating cartridges 20, 20' of any suitable construction known to the art.

The upper ends of each of the annular heat exchange chambers 18, 18' of the generator-absorbers A, A' are connected by conduits 34, 34' to the secondary condensers 36, 36'. The secondary condensers 36, 36' have a continuous downward slope throughout and lead to a reservoir 38. The reservoir 38 is connected by conduit 40 to a valve chamber 42. The valve chamber 42 is connected by conduits 44, 44' to the lower end of the annular heat exchange vessels 18, 18' for the generator-absorbers A, A'.

Each of the evaporators E, E' consist of two coiled conduits 47, 47' and 48, 48' and conduits 50, 50' which extend vertically downward from the receiving vessels 16, 16' and connect with the lower inner ends of the coiled conduits 47, 47' and 48, 48' while the upper ends of the coiled conduits 47, 47' and 48, 48' enter the receiving vessels 16, 16' near the top thereof. The coiled conduits 47, 47' are in heat exchange relationship with a freezing chamber 52 while the coiled conduits 48, 48' have heat exchange fins thereon for cooling the food storage compartment of a domestic refrigerator.

The thermostatic bulbs 56, 56' contact the outer surfaces of the generator-absorbers A, A' and are connected by capillary tubes 58, 58' to bellows 60, 60', which upon expansion and contraction are adapted to operate the snap acting device 45. The bulbs 56, 56', tubes 58, 58' and bellows 60, 60' contain a suitable vaporizable fluid so that the bellows 60, 60' will expand and contract upon variation in temperature of the bulbs 56, 56' as is well known in the art. A snap acting switch 62 of any well known construction is positioned to be actuated by the snap acting device 45.

A thermostatic bulb 64 is positioned in contact with the freezing chamber 52 and is responsive to the temperature of that chamber. Bulb 64 is connected by capillary tube 66 to a bellows 68. Bulb 64, tube 66 and bellows 68 contain a suitable vaporizable fluid so that the bellows 68 will expand and contract upon variations in temperature of the freezing chamber 52 as is well known in the art. The bellows 68 upon expansion and contraction is adapted to actuate a snap-acting device 70 which in turn operates the valve 72 in the conduit 40 and an electrical switch 74.

Referring to Figures 2, 3 and 4 the valve chamber 42 forms a housing for a slidable valve 71 having ends 46, 46' which cooperate with valve seat members 73, 73'. Upon reciprocation the valve element 71 cooperates with the seats 73, 73' to open or close the openings leading to the conduits 44, 44'. The conduit 40 leads into the interior of the valve chamber 42 near the right hand end thereof and the valve seat 73' has grooves 76 to allow fluid to pass along the sides of the seat member 73' whether the valve element 71 is in seating engagement with the valve seat member 73' or not. The valve element 71 has grooves 78 cut in the exterior thereof to allow fluids to pass from one end thereof to the other.

Slidably mounted on the exterior of the valve housing 42 is a permanent magnet 80 having north and south poles at the opposite ends thereof and which is adapted to be reciprocated to the right and to the left by the snap-acting device 45.

The valve chamber 42 is made of non-magnetic material such as certain types of stainless steel while the valve element 71 and the valve seat members 73 and 73' are made of magnetic material. The permanent magnet 80 is preferably made of a material obtainable on the open market under the trade name of "Alnico" which is an alloy of nickel, aluminum, chromium and iron in proper proportions. The valve element 71 and the permanent magnet 80 are made of such length that when the valve element 71 is moved either to the right or to the left a circuit for magnetic lines of force is formed emanating from one end of the magnet 80, passing through the non-magnetic wall 42 into the valve seat members 73 or 73', as the case may be, through the valve element 71 and back to the other end of the magnet 80 again after passing through the non-magnetic wall of the chamber 42. In such a construction the valve element 71 is held tightly against its seat by the magnetic lines of force regardless of whether the valve and the magnet 80 are moved to the right or to the left.

When the permanent magnet 80 is moved to the left as shown in Figure 2, the magnetic lines of force will cause the valve element to move therewith and force the end 46 of the valve element 71 against the magnetic seat 73 to close the opening to the conduit 44. Under these conditions the indirect cooling fluid enters the valve chamber 42 by the conduit 40, passes through the grooves 76 in the valve seat member 73' and through the opening in the valve element 73' to the conduit 44'. When the snap-acting device 45 operates to move the magnet 80 to the right, the magnetic circuit will be broken by the movement of the left hand end of the magnet from directly over the valve seat member 73 and quickly move the valve element 71 to the right to establish another magnetic circuit and hold the end 46' of the valve element 71 against the valve seat member 73' to close the opening to the conduit 44'. Under these conditions the indirect cooling fluid will enter the valve chamber 42 by conduit 40, flow through grooves 76 in the valve seat member 73', through the grooves 78 in the valve element 71 and enter the opening in the valve seat member 73 and thus flow into the conduit 44.

The operation of the refrigerating unit as shown in Figure 1 is adequately described in an application for United States Letters Patent by Otis B. Sutton, Serial No. 446,471, filed June 10, 1942, and reference is made to that application for an explanation of the operation of the refrigerating system of Figure 1, which merely shows a setting for the present invention.

From the foregoing it can be seen that the valve constructed in accordance with this invention diverts fluid to either of two circuits in a closed system by means of a permanent magnet mounted exteriorly of the system which acts to hold the valve tightly closed in either position to which it is moved whereby it is not necessary to transmit motion from the exterior to the movable valve on the interior of the system by means of a mechanical transmitting device requiring a movable element extending through the walls of the fluid system.

While I have shown but a single embodiment of my invention, it is to be understood that this embodiment is to be taken as illustrative only and not in a limiting sense. I do not wish to be limited to the particular structure shown and described but to include all equivalent variations thereof except as limited by the scope of the claims.

I claim:

1. A valve for controlling the flow of fluid in a hermetically closed system comprising, a non-magnetic shell adapted to be hermetically sealed to the system walls, a magnetic valve element slidably mounted within said shell, a magnetic seat member for said valve fixed within said shell and a permanent magnet slidably mounted on the exterior of said shell and being so positioned relative to said valve element and valve seat member that said valve element is moved against and away from said seat member when said magnet is reciprocated and said valve element, valve seat member and magnet being so related as to form a closed path for magnetic lines of force when the valve is in closed position.

2. A valve for controlling the flow of fluid in a hermetically closed system comprising, a non-magnetic shell adapted to be hermetically sealed to the system walls, a magnetic valve element slidably mounted within said shell, a magnetic valve seat member fixed within said shell at each end thereof, the ends of said valve element being formed to cooperate with one of said valve seat members when moved in either direction and a permanent magnet slidably mounted on the exterior of said shell and being so positioned as to move the ends of said valve element against one of said seat members when moved in either direction.

3. A valve for controlling the flow of fluid in a hermetically closed system comprising, a non-magnetic shell adapted to be hermetically sealed to the system walls, a magnetic valve element slidably mounted within said shell, a magnetic valve seat member fixed within said shell at each end thereof, the ends of said valve element being formed to cooperate with one of said valve seat members when moved in either direction and a permanent magnet slidably mounted on the exterior of said shell and being so positioned as to move the ends of said valve element against one of said seat members when moved in either direction and said valve element, valve seat members and magnet being so related as to form closed paths for magnetic lines of force when the valve is in either closed position.

4. A valve for controlling the flow of fluid in a hermetically closed system comprising, a non-magnetic shell adapted to be hermetically sealed to the system walls, a magnetic valve element slidably mounted within said shell, an apertured magnetic valve seat member fixed within said shell at each end thereof, said valve element cooperating with one of said valve seat members to close its aperture when moved in either direction and a permanent magnet slidably mounted on the exterior of said shell and being so positioned as to move said valve element against one of said seat members when moved in either direction, said valve element being so formed as to provide for the flow of fluid from one end thereof to the other.

5. A valve for controlling the flow of fluid in a hermetically closed system comprising, a sleeve of non-magnetic material adapted to be hermetically sealed to the walls of the system including a conduit welded to each end of said sleeve and a side conduit connected to the interior of said sleeve through its side wall near one end thereof, a double ended valve element of magnetic material slidably mounted in the interior of said sleeve, a valve seat member of magnetic material fixed to the interior of said sleeve at each end and having a central opening to cooperate with the ends of said valve element, one of said valve seat members being positioned at the side conduit and being so formed as to allow fluids to flow from said side conduit to the interior of said sleeve and an annular permanent magnet slidably mounted on the exterior of said sleeve and being so positioned relative to said valve element and said valve seat members that movement of said magnet in either direction will move an end of said valve element against one of said valve seat members to close its central opening.

6. A valve for controlling the flow of fluids in a hermetically closed system comprising, a sleeve of non-magnetic material adapted to be hermetically sealed to the walls of the system, including a conduit welded to each end of said sleeve and a side conduit connected to the interior of said sleeve through its side walls near one end thereof, a double ended valve element of magnetic material slidably mounted in the interior of said sleeve, a valve seat member of magnetic material fixed to the interior of said sleeve at each end thereof and having a central opening to cooperate with the ends of said valve element, one of said valve seat members being positioned at said side conduit and being so formed as to allow fluid to flow from said side conduit to the interior of said sleeve and an annular permanent magnet slidably mounted on the exterior of said sleeve and being so positioned relative to said valve element and said valve seat members that movement of said magnet in either direction will move an end of said valve element against one of said valve seat members to close its central opening, said valve element being constructed to allow fluid to flow from one end thereof to the other.

7. A valve for controlling the flow of fluids in a hermetically closed system comprising, a sleeve of non-magnetic material adapted to be hermetically sealed to the walls of the system including a conduit welded to each end of said sleeve and a side conduit connected to the interior of said sleeve through its side wall near one end thereof, a double ended valve element of magnetic material slidably mounted in the interior of said sleeve, a valve seat member of magnetic material fixed to the interior of said sleeve at each end thereof and having a central opening to cooperate with the ends of said valve element, one of said valve seat members being positioned at said side conduit and being so formed as to allow fluids to flow from said side conduit to the interior of said sleeve and an annular permanent magnet slidably mounted on the exterior of said sleeve and being so positioned relative to said valve element and said valve seat members that movement of said magent in either direction will move an end of said valve element against one of said valve seat members to close its central opening and said valve element, valve seat members and magnet being so related as to form closed paths for magnetic lines of force when the valve is in either closed position.

8. A valve for controlling the flow of fluid in a hermetically closed system comprising, a non-magnetic shell adapted to be hermetically sealed to the system walls, a magnetic valve element slidably mounted within said shell, a magnetic seat member for said valve, fixed within said shell, a permanent magnet mounted for reciprocation on the exterior of said shell and being so positioned relative to said valve element and valve seat member that said valve element is moved against and away from said seat member when said magnet is reciprocated and a snap acting device for reciprocating said permanent magnet.

9. A valve for controlling the flow of fluid in a hermetically closed system comprising, a non-magnetic shell adapted to be hermetically sealed to the system walls, a magnetic valve element slidably mounted within said shell, a magnetic valve seat member fixed within said shell at each end thereof, the ends of said valve element being formed to cooperate with one of said valve seat members when moved in either direction, a permanent magnet mounted for reciprocation on the exterior of said shell and being so positioned as to move the ends of said valve element against one of said seat members when moved in either direction and a snap acting device for reciprocating said permanent magnet.

10. A valve for controlling the flow of fluid in a hermetically closed system comprising, a sleeve of non-magnetic material adapted to be hermetically sealed to the walls of the system including a conduit welded to each end of said sleeve and a side conduit connected to the interior of said sleeve through its side wall near one end thereof, a double ended valve element of magnetic material slidably mounted in the interior of said sleeve, a valve seat member of magnetic material fixed to the interior of said sleeve at each end thereof and having a central opening to cooperate with the ends of said valve element, one of said valve seat members being positioned at said side conduit and being so formed as to allow fluids to flow from said side conduit to the interior of said sleeve, and an annular permanent magnet mounted for reciprocation on the exterior of said sleeve and being so positioned relative to said valve element and said valve seat members that movement of said magnet in either direction will move an end of said valve element against one of said valve seat members to close its central opening, said valve element, valve seat members and magnet being so related as to form closed paths for magnetic lines of force when said valve is moved to either closed position and a snap acting device for reciprocating said permanent magnet.

JUSTICE H. BEACH.